(12) United States Patent
Trofin et al.

(10) Patent No.: US 9,430,200 B1
(45) Date of Patent: Aug. 30, 2016

(54) CROSS-LIBRARY FRAMEWORK ARCHITECTURE FEATURE SETS

(71) Applicant: Microsoft Technology Licensing, LLC, Redmond, WA (US)

(72) Inventors: Mircea Trofin, Mountain View, CA (US); Krzysztof J. Cwalina, Sammamish, WA (US); Patrick H. Dussud, Redmond, WA (US); John Duffy, Mercer Island, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 14/731,187

(22) Filed: Jun. 4, 2015

(51) Int. Cl.
*G06F 9/45* (2006.01)

(52) U.S. Cl.
CPC .................................. *G06F 8/443* (2013.01)

(58) Field of Classification Search
None
See application file for complete search history.

(56) References Cited

U.S. PATENT DOCUMENTS

| | | | |
|---|---|---|---|
| 6,110,226 A | 8/2000 | Bothner | |
| 6,289,506 B1 | 9/2001 | Kwong et al. | |
| 6,467,086 B1 | 10/2002 | Kiczales et al. | |
| 7,213,240 B2 | 5/2007 | Wong et al | |
| 7,818,730 B1 * | 10/2010 | Ryan | G06F 8/34 717/140 |
| 8,161,465 B2 | 4/2012 | Yang et al. | |
| 8,473,935 B2 | 6/2013 | Grice | |
| 8,522,218 B2 | 8/2013 | Biswas et al. | |
| 2003/0070161 A1 * | 4/2003 | Wong | G06F 8/443 717/148 |
| 2004/0015678 A1 * | 1/2004 | Strom | G06F 9/30101 712/202 |
| 2008/0235675 A1 * | 9/2008 | Chen | G06F 8/437 717/147 |
| 2011/0307858 A1 | 12/2011 | Biswas et al. | |
| 2013/0145353 A1 * | 6/2013 | Tsai | G06F 9/4426 717/140 |
| 2013/0311980 A1 | 11/2013 | Cabillic et al. | |
| 2014/0330763 A1 * | 11/2014 | Hunt | G06N 3/105 706/42 |

OTHER PUBLICATIONS

Wagner, Luke, "ASM.JS AOT Compilation and Startup Performance", Published on: Jan. 14, 2014, retrieved from <<https://blog.mozilla.org/luke/2014/01/14/asm-js-aot-compilation-and-startup-performance/>>, 12 pages.

"Mono Ahead of Time Compiler", Published on: Jan. 1, 2015, retrieved from <<http://www.mono-project.com/docs/advanced/runtime/docs/aot/>>, 8 pages.

(Continued)

*Primary Examiner* — Daxin Wu
(74) *Attorney, Agent, or Firm* — Kevin Sullivan; Kate Drakos; Micky Minhas (57) ABSTRACT

API (application program interface) features defined by a set of APIs provide a different cross-sectional view of an application or framework than the view provided by sectioning along class or library boundaries, or binding units, for example. An API feature includes a proper subset of a library of a framework used by an application, and/or APIs which collectively reside in different libraries. A functionality feature API set provides an exposed surface area of a functionality feature of an application. Upon receiving a compilation request and determining that an API feature is to be excluded, an attempt is made to produce a compiled version of the application without the feature's APIs. In some cases, the functionality feature is independent of a baseline functionality of the application. Developers can obtain smaller but fully functional binaries. Framework architects can identify dependencies between API implementations when creating or modifying a software framework's architecture.

24 Claims, 3 Drawing Sheets

(56) References Cited

OTHER PUBLICATIONS

Cousins, Seth, "Android to Include Ahead-Of-Time Compiler", Published on: Jul. 12, 2014, retrieved from <<http://www.infoq.com/news/2014/07/ahead-of-time-compiler-os>>, 14 pages.

"Clojure", Published on: Dec. 10, 2008, retrieved from <<http://clojure.org/compilation>>, 5 pages.

"Compiling MSIL to Native Code", Published on: Apr. 5, 2010, retrieved from <<https://msdn.microsoft.com/en-us/library/ht8ecch6(v=vs.90).aspx>>, 2 pages.

"Xamarin", Retrieved on: Mar. 28, 2015, retrieved from <<http://www.xlsoft.com/en/products/xamarin/how-it-works.html>>, 3 pages.

Mary Jo Foley, "Microsoft releases a preview build of its mysterious 'Project N'", retrieved from <<http://www.zdnet.com/article/microsoft-releases-a-preview-build-of-its-mysterious-project-n/>>, Apr. 3, 2014, 5 pages.

Clemens Vasters, "Composite Metadata (this will change your life)", retrieved from <<http://vasters.com/clemensv/2003109/25/Composite+Metadata+This+Wi II+Change+Your+Ufe.aspx>>, Sep. 25, 2003, 10 pages.

"JavaScript: What are .extend and .prototype used for?", retrieved from <<http://stackoverflow.com/questions/3781373/>>, Sep. 23, 2010, 3 pages.

"[Q] mixin pattern—how to use an alternate Behavior for Class", retrieved from <<http://lists.squeakfoundation.org/pipermail/squeak-dev/2002-January/033580.html>>, Jan. 28, 2002, 5 pages.

Gilad Bracha, et al., "Extending Smalltalk with Mixins", retrieved from <<http://www.bracha.org/mwp.html>>, 1996, 4 pages.

"Mixin", retrieved from <<http://en.wikipedia.org/wiki/Mixin>>, May 19, 2015, 5 pages.

"Aspect-oriented programming", retrieved from <<http://en.wikipedia.org/wiki/Aspect-oriented_programming>>, May 13, 2015, 14 pages.

"AspectJ", <<retrieved from http://en.wikipedia.org/wiki/AspectJ>>, Apr. 6, 2015, 4 pages.

"Software bloat", retrieved from <<http://en.wikipedia.org/wiki/Software_bloat>>, May 19, 2015, 5 pages.

Peter StJ, "Look, there is someone on the tree!: Tree shaking and should you care about it.", retrieved from <<http://pstj.blogspot.com/2013/01/tree-shaking-and-should-you-care-about.html>>, 2013, 3 pages.

"Object.ToString Method (System)", retrieved from <<https://msdn.microsoft.com/en-us/library/system.object.tostring (v=vs.110).aspx>>, no later than Apr. 9, 2015, 3 pages.

"Object. Equals Method (System)", retrieved from <<https://msdn.microsoft.com/en-us/library/system.object.equals (v=vs.110).aspx>>, no later than Apr. 9, 2015, 1 page.

"Object.GetHashCode Method (System)", retrieved from <<https://msdn.microsoft.com/en-us/library/system.object.gethashcode(v=vs.110).aspx>>, no later than Apr. 9, 2015, 6 pages.

"Application programming interface", retrieved from <<http://en.wikipedia.org/wiki/Application_programming_interface>>, Mar. 27, 2015, 12 pages.

"Writing Custom Attributes", retrieved from <<https://msdn.microsoft.com/en-us/library/84c42s56(v=vs.110).aspx>>, no later than Apr. 2, 2015, 4 pages.

"Ada95: A brief History", retrieved from <<http://www.google.com/url?sa=t&rct=j&q=&esrc=s&source=web&cd=1&cad=rja&uact=8&ved=0CB4QFjAA&url=http%3A%2F%2Fwww.cs.nyu.edu%2Fcourses%2Ffall04%2FG22.2110-001%2Fpl.lec3.ppt&ei=LKodVePvK5bsoATty4HgBw&usg=AFQjCNGJRzxytfyOQxWs6zaDyTtmlo9ZFA&bvm=bv.89744112,bs.1,d.cWc>>, 1997, 76 pages.

Vasian Cepa, et al., "Declaring and Enforcing Dependencies Between .NET Custom Attributes", retrieved from <<http://soft.vub.ac.be/svn-pub/SmartAnnotations/Thesis%20-%20-%20Rogge%20Suzan/papers/Declaring%20and%20enforcing%20dependencies%20between%20.NET%20custom%20attributes.pdf, 2004, 15 pages.

Zef Hemel, et al., "PIL: A Platform Independent Language for Retargetable DSLs", retrieved from <<http://swerl.tudelft.nl/twiki/pub/Main/TechnicalReports/submission.pdf>>, 2009, 20 pages.

"Class (computer programming)", retrieved from <<http://en.wikipedia.org/wiki/Class_(computer_programming)>>, Feb. 16, 2015, 17 pages.

"C preprocessor", retrieved from <<http://en.wikipedia.org/wiki/C_preprocessor>>, Mar. 9, 2015, 9 pages.

"[Resolved] if false then . . . ", retrieved from <<http://www.vbforums.com/showthread.php?528186-RESOLVED-if-false-then>>, 2008, 2 pages.

"Is a C++ destructor guaranteed not to be called until the end of the block?", retrieved from <<http://stackoverflow.com/questions/2087600/is-a-c-destructor-guaranteed-not-to-be-called-until-the-end-of-the-block>>, 2010, 4 pages.

Anthony Bishopric, "Whitelisting and Blacklisting", retrieved from <<https://github.com/box/augmented_types/wiki/Whitelisting-and-Blacklisting>>, Jan. 31, 2014, 2 pages.

\* cited by examiner

CROSS-LIBRARY FRAMEWORK ARCHITECTURE FEATURE SETS

BACKGROUND

The word "bloat" is sometimes used to describe software X which is slower, bigger, more complicated to use, or more demanding of resources than some other software Y. Software Y could be a previous version of X, or a competing product, or a hypothetical product, for example. Responses to perceived software bloat, and proactive efforts to reduce or prevent bloat, take a wide range of forms, many of which complement one another.

For example, architects of some systems divide system functionality into a core operating system and a number of discrete related utility programs. The functionality of each individual utility is (at least in theory) narrowly constrained, e.g., performing file compression/decompression in a specified file format, searching for a specified string, listing the filenames in a specified directory, copying a specified file, and so on. Pipes, scripts, and/or other connective mechanisms are provided through a command interpreter to permit customized combinations of the utility programs which focus (at least initially) on a particular well-defined problem or purpose.

As another example, in some programming environments compiler preprocessor directives can be used by a developer to either include or exclude delimited portions of source code in a compilation. Thus, code that contains print statements to aid debugging may be included in development binary versions of a program but excluded from a publicly released production binary.

As a further example, some web browsers support add-on or plug-in functionality. The add-ons may be downloaded as separate items, are often not installed at the same time as the browser's core component(s), are not required for basic browser functionality such as viewing web pages, and are often created by vendors other than the browser vendor.

SUMMARY

Some embodiments disclosed herein are directed to the technical activity of excluding code from an application's executable binary without impairing the application's functionality. Some embodiments are directed to the related technical activity of identifying dependencies between API (application program interface) implementations when creating or modifying a software framework's architecture. Other technical activities pertinent to teachings herein will also become apparent to those of skill in the art.

Some embodiments provide API features that are defined in terms of a set of APIs of an established runtime framework. An API feature is orthogonal to an object-oriented boundary of an application targeting the established runtime framework in that the API feature includes a proper subset of a library of the framework that is used by the application. Thus, the API feature provides a different cross-sectional view of the application or framework than the view provided by sectioning along class or library or binding unit boundaries, for example. The functionality feature API may identify APIs which collectively reside in different libraries of the system. In some embodiments, a functionality feature API set provides an exposed surface area of a functionality feature of an application. In some cases, the functionality feature is independent of a baseline functionality of the application. Upon receiving a request to perform a compilation of an application, and determining that an API feature is to be excluded, some embodiments attempt to perform the compilation to produce a compiled version without the identified APIs.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Some acronyms are defined below, but others may be defined elsewhere herein or require no definition to be understood by one of skill.

ALU: arithmetic and logic unit
AOC: ahead-of-time compilation
AOT: ahead-of-time
API: application program interface
CD: compact disc
CPU: central processing unit
DLL: dynamic-link library
DVD: digital versatile disk or digital video disc
FPGA: field-programmable gate array
FPU: floating point processing unit
GPU: graphical processing unit
GUI: graphical user interface
GUID: globally unique identifier
ID: identification, identify
IDE: integrated development environment, sometimes also called "interactive development environment"
IR: intermediate representation
JIT: just-in-time compilation
RAM: random access memory
ROM: read only memory
XML: extensible markup language Overview Object-oriented frameworks tend to group related functionality in the form of application program interfaces (APIs) on a type. Sometimes this results in poor functional layering, which translates into large dependency sets, which result in large binary image sizes for programs. In some ahead-of-time compilation scenarios, dependency reduction techniques in the form of best effort tree shaking have been employed in an effort to reduce the size of program binaries. However, techniques which merely perform "best effort" optimizations for size lack controls usable by developers to direct size reduction on a granular basis within the program. In particular, the size impact of calling or not calling particular APIs is generally not readily apparent to developers except by tedious and error-prone experimentation which would unacceptably slow down program development activities.

Some programming languages such as C and C++ allow developers to use conditional compilation to gain some control over binary size, e.g., by directing the compiler to ignore sections of source code which primarily exist to aid debugging. However, such compiler directives provide no explicit information about API usage after compile time. They are not part of the overall system runtime architecture, e.g., they are not part of a runtime framework or part of a runtime library implementation. By contrast, some examples taught herein provide reusable binary artifacts which carry explicit information about API usage, API interdependencies, API sizes, and/or other API feature information. Reuse scenarios are thus promoted.

Some embodiments described herein provide or utilize a mechanism permitting object oriented frameworks to publically identify sets of APIs, called "API features", which are orthogonal to familiar object-oriented boundaries, e.g., cross-cutting as to types, libraries, and/or binding units (a binding unit is code imported to an application as a unit by a linker and/or binder). Some of the embodiments support dependency relations between such sets of APIs, with a dependency management mechanism for creating, removing, and/or discovering dependencies among API features. Some provide a mechanism for developers to identify which API features they intend to take a dependency on, and which they intend to avoid in their application binary. In some embodiments, an ahead-of-time compilation toolchain (e.g., compiler plus linker/binder plus loader) takes into consideration the developer's expressed intentions and library implementations, e.g., by treating calls to explicitly opted out API features as errors, and/or by producing a compiled image where no APIs of the opted out API features are present.

A given embodiment may be described in framework documentation given to application developers. An embodiment's interface could presented application developers with compilation options, permitting the developer to receive a report on, and/or to request the exclusion of, certain API features. However, an embodiment could also be used behind the scenes for optimization, in which case the use could be evident in a program's decreased binary size and/or the inclusion/exclusion of APIs that are not actually invoked by the program. Framework architects can use the teachings herein to help organize and/or (re)factor framework APIs for efficient optimization such as the exclusion of unnecessary code from an application or framework binary.

Some embodiments described herein may be viewed in a broader context. For instance, concepts such as classes, exclusion, functionality, interfaces, libraries, and size may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving classes, exclusion, functionality, interfaces, libraries, and/or size are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities such as software program compilation and management of computing or storage resource usage by software programs. Second, some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein ascertain, add, or remove dependencies between sets of API implementations. Third, technical effects provided by some embodiments include decreased binary program size and persisted-after-compilation information about which API features are used in or excluded from a particular program binary. Fourth, some embodiments include technical adaptations such as enhanced compilers, companion files defining API sets as a feature, partial classes based on API feature set definitions, and framework API source code attributes or other annotations marking APIs as belonging to one or more particular cross-cutting API feature sets. Fifth, some embodiments modify technical functionality of a compilation toolchain by recognizing and responding to requests to exclude specified sets of APIs based on technical considerations such as compiler options, API size, and API implementation dependencies. Sixth, technical advantages of some embodiments include decreased binary program size without a corresponding loss of functionality, with resulting reduced storage hardware requirements, faster load processing, and easier program debugging.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

"API" or "application program interface" means a set of one or more function signatures, class definitions, and/or public data type definitions which can be used in an application program and which are publicly documented for such use. An API can also be viewed as a surface area (exposed portion) of an underlying API implementation, since one of the main design uses of APIs is to modularize details, which can improve software organization, make it easier to understand, and provide flexibility without unwanted side effects when software is changed.

"API implementation" means software which implements at least part of an API. For example, a function signature in an API can be implemented with function body software which upon execution accepts zero or more parameters as specified in the signature, performs operations using the parameter values accepted, and returns a result. As another example, a class definition may be implemented with constructor software that allocates memory for an object which is an instance of the class, and initializes a symbol table with the address of the allocated memory to permit other software to access members of the object. As yet another example, a public data type definition may be implemented with software that performs type checking to detect inconsistencies between the public data type definition and assignments or other expressions that involve reading or writing data to a variable which is defined to have the data type. More generally, an API implementation is a particular way of providing functionality that is specified by the API. A given API can have multiple implementations which have different characteristics, such as different memory usage, different processing speed, different assumptions about runtime support, different assumptions about the processor(s) they will execute on, different programming languages, different versioning histories, and so on.

"Application program" means one or more custom files written by one or more developers plus one or more libraries, which are or will be bound together during compilation for execution.

"Aspect" as used herein does not refer to the specific meaning ascribed to that term in aspect oriented programming documentation, unless expressly stated otherwise. Rather, the default meaning of "aspect" is "a particular part or facet or characteristic of something."

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Code" means processor instructions, data (which includes constants, variables, and data structures), or both instructions and data.

"Compiler" refers to a compilation toolchain and/or a portion of such a toolchain. An example compilation toolchain includes a directive preprocessor, compiler front end (e.g., parsing, lexical analysis, abstract syntax tree creation, type checking, object binding, tuple generation, intermediate representation generation), compiler back end (data flow analysis, native code generation, code optimizations), binder, linker, and loader. Unless specifically stated otherwise, compilers include interpreters. Ahead-of-time compilation is presumed in some examples, but teachings herein may also be applied to just-in-time compilation.

"Computationally" means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

"Feature" herein refers to an API feature.

"Framework" means a collection of libraries used in different application programs which are run by different entities on different systems. Some examples include Microsoft .NET framework, Microsoft Foundation Class Library, Google Android Application Framework, Apple iOS Cocoa framework, Oracle Application Development Framework, and many others.

"Functionality feature" or "API feature" means an aspect of application program functionality which is optional, in the sense that the functionality is not required by every version of the application program in question. For example, some kind of I/O is required by every application program, but the use of a particular I/O device such as a touchpad or light pen might well be optional. Likewise, some sort of data processing is required by almost every application program, but some versions of an application could simply accept data inputs and try to process them without checking their validity (e.g., are they within an expected value range and of an expected data type), whereas other versions of the same application perform data validation on inputs and only perform the processing on data inputs that are deemed valid. More generally, functionality features are aspects of program functionality that can be described to application developers and/or framework designers (a.k.a. framework architects) in natural language by a short phrase. Some examples include data logging, event logging, data validation, event validation, localization of strings, localization of a display format, administrator alerts, inspection of data without alteration of the data, malware scanning, scanning for a code security vulnerability, collections support, serialization support, debugging support, or reporting on one of the foregoing.

"Functionality feature API set" means a surface area of a functionality feature. For example, a functionality feature API set may be specified as a list of two or more APIs from two or more different libraries which are designated by a framework architect as supporting the same functionality feature. API features and their defining sets provide framework architects and application developers with a level of API grouping modularity that is above the level of APIs themselves, yet also different from the library modularity that conventionally groups APIs.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

"Kernels" include operating systems, hypervisors, virtual machines, BIOS code, and similar hardware interface software.

"Library" means a group of one or more APIs and corresponding API implementations which are bound to an application program as a unit by compilation, even when only one of the APIs is actually used (instantiated, invoked, or otherwise referenced) in a custom file of the application program.

"Linguistically" means by using a natural language or another form of communication which is often employed in face-to-face human-to-human communication. Communicating linguistically includes, for example, speaking, typing, or gesturing with one's fingers, hands, face, and/or body.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

"Optimize" means to improve, not necessarily to perfect. For example, it may be possible to make further improvements in a program which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, annotating, ascertaining, assessing, attempting, binding, compiling, defining, determining, excluding, executing, flagging, issuing, linking, loading, marking, optimizing, performing, producing, providing, receiving, refactoring, releasing, removing, reporting, requesting, selecting, specifying, tree shaking, using (or adds, added, annotates, annotated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

Figure 1:
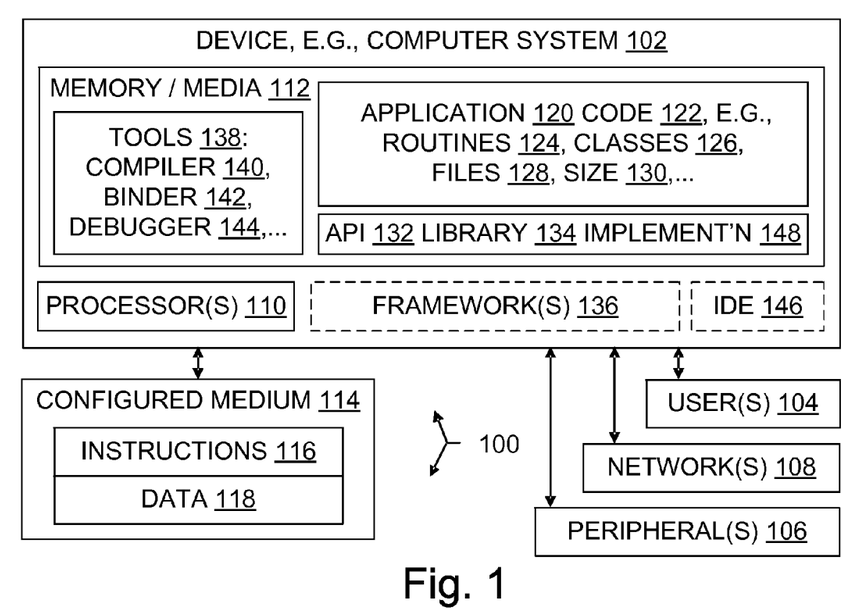
FIG. 1 is a block diagram illustrating a computer system having at least one processor and at least one memory which interact with one another under the control of software utilizing libraries and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

One of skill will appreciate that the foregoing aspects and other aspects presented herein under "Operating Environments" may also form part of a given embodiment. This document's headings are not intended to provide a strict classification of features into embodiment and non-embodiment feature classes.

In the illustrated environments 100, one or more applications 120 have code 122 such as routines 124 and classes 126 stored in files 128 which have respective sizes 130. Other code in the form of APIs 132 organized in libraries 134 is present for use by one or more applications, as stand-alone libraries or as part of a framework 136. Software development tools 138 such as compilers 140, binders 142, and debuggers 144 assist with software development by producing, illuminating, and/or transforming code 122.

A given operating environment 100 may include an Integrated Development Environment (IDE) 146 which provides a developer with a set of coordinated software development tools 138 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

The code 122, tools 138, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, display(s), and battery(ies), an operating environment may also include other hardware, such as buses, power supplies, wired and wireless network interface cards, and accelerators, for instance, whose respective operations are described herein to the extent not already apparent to one of skill. The display may include one or more touch screens, screens responsive to input from a pen or tablet, or screens which operate solely for output.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
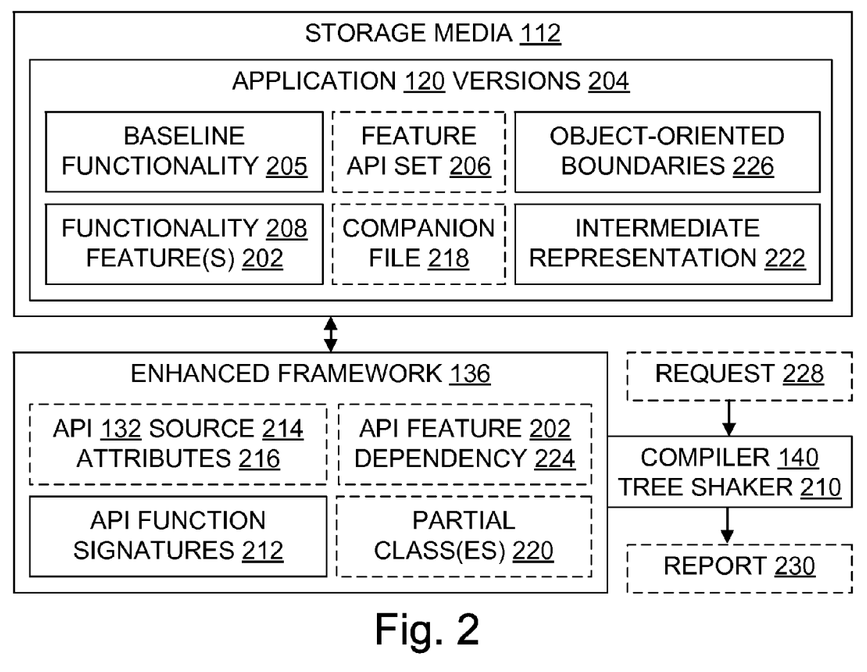
FIG. 2 is a block diagram illustrating aspects of functionality feature set definition, modification, and utilization in an example architecture.

FIG. 2 illustrates aspects of a system architecture which is suitable for use with some embodiments. The system has an exposed surface area of an API feature 202, with the API feature defined in terms of application baseline functionality 205 and libraries 134. Aspects of FIG. 1 are relevant. For instance, the system includes a processor 110 and a memory 112 in operable communication with the processor. In addition, one system includes a functionality feature application program interface (API) set 206, namely, an exposed surface area of a functionality feature 208 of an application program 120. The functionality feature API set 206 identifies two or more APIs 132 which in this example collectively reside in two or more different libraries 134 of the system, and the functionality feature 202 is independent of the baseline functionality 205 of the application program. The baseline functionality is core functionality 208 which is under development or implemented in development versions 204 of the application and is also present in the current released version(s) 204 of the application, if any. Baseline functionality 205 implements core business logic; it is the primary reason for the application's existence.

In some examples, the API feature 202 includes a function 124 that conventional (e.g., not driven or guided by API features 202) tree shaking will not remove from the application 120. That is, the system 102 includes a compiler 140 having a tree shaking code reduction component 210, and the functionality feature API set 206 Identifies at least one API 132 which includes a function signature 212 having an implementation 148 that is not separable from the baseline functionality 205 of the application program by the tree shaking code reduction component 210.

In some examples, the API feature 202 is defined using custom attributes in API source code. That is, the functionality feature 202 is defined at least in part by an API source code 214, 122 which is marked with an attribute 216 that is specific to the functionality feature and indicates that the API source code belongs to the functionality feature.

In some examples, the API feature 202 is defined using a companion file 218, e.g., an XML file. Thus, in some cases the functionality feature 202 is defined at least in part by a text file 218 which indicates that the API belongs to the functionality feature. However, those of skill will acknowledge that there are numerous ways to define features in addition to those specifically enumerated here. Custom attributes 216 and companion files 218 are merely examples. Some of the many other suitable definitional mechanisms for API features 202 include metadata that is not expressed in source, placement in a separate table or dedicated database, using naming conventions, or using so-called magic numbers (e.g., GUIDs). In some examples, the API feature 202 is defined (at least in part) using a partial class 220 in the application's intermediate representation 222.

Dependencies 224 may exist between API features. For instance, in some cases a dependency specification 224 specifies that the functionality feature 202 has an implementation 148 which depends on another functionality feature's implementation.

Examples of API features 202 may vary between embodiments. In general, however, the baseline functionality 205 of the application program 120 excludes a given functionality X when the functionality feature 202 includes the functionality X. By way of particular examples, in some embodiments the functionality X provides at least one of the following: data logging, event logging, data validation, event validation, localization of strings, localization of a display format, globalization support, administrator alerts, inspection of data without alteration of the data, malware scanning, scanning for a code security vulnerability, collections support, serialization support, deserialization support, debugging support, data pretty print support, source code pretty print support, or reporting on one of the foregoing.

In some cases, the API 202 feature is part of an enhanced framework 136, and refactoring 338 the framework would break the framework or the application or both. Thus, in some embodiments the functionality feature API set 206 identifies APIs 132 of an "established" runtime framework 136 (one released by a vendor for commercial and/or open source usage). The execution 350 of the application program 120 without any API function call parameter mismatch depends in part on current function signatures 212 of the APIs, so refactoring 338 the APIs would break the application program. In some cases, some refactorings or redesign could break the framework (remove its functionality). Other changes to frameworks can be non-breaking. For example, additive changes are usually non-breaking. Also, changes in implementation are sometimes non-breaking. However, those of skill will understand that once a framework becomes established, developers come to rely on APIs of the framework and thus altering the APIs can introduce errors such as misplaced memory writes, buffer overflows, crashes, data corruptions, unhandled exceptions, and so on.

Some embodiments provide a computer system 102 with a logical processor 110 and a memory medium 112 configured by circuitry, firmware, and/or software to provide technical effects such as reduced binary file size 130 directed at technical activities such as framework architecting and/or application program compiling, by extending functionality with API features 202 cutting across object-oriented boundaries 226 as described herein. In particular, compilers 140 and frameworks 136 can be enhanced to recognize and include API features that cut across library, type and/or binding unit boundaries 226.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, compilation requests 228 originating on one device/system 102 in a networked cloud may control an enhanced compiler 140 running on another device/system within the cloud, and resulting reports 230 about API feature usage in a binary may configure the display on yet other cloud device(s)/system(s) 102.

Processes

Figure 3:
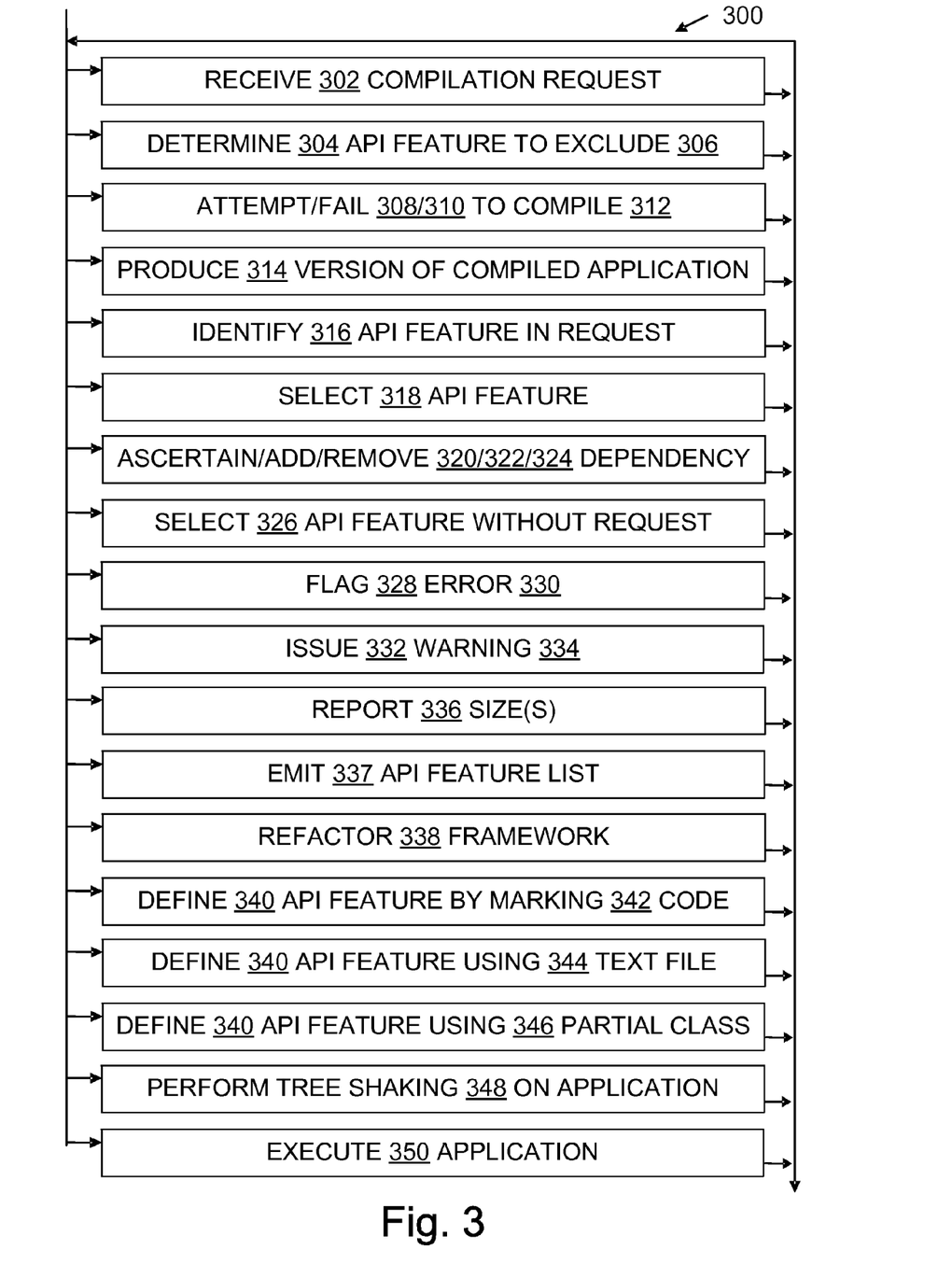
FIG. 3 is a flow chart illustrating steps of some process and configured storage medium examples.
Figure 4:
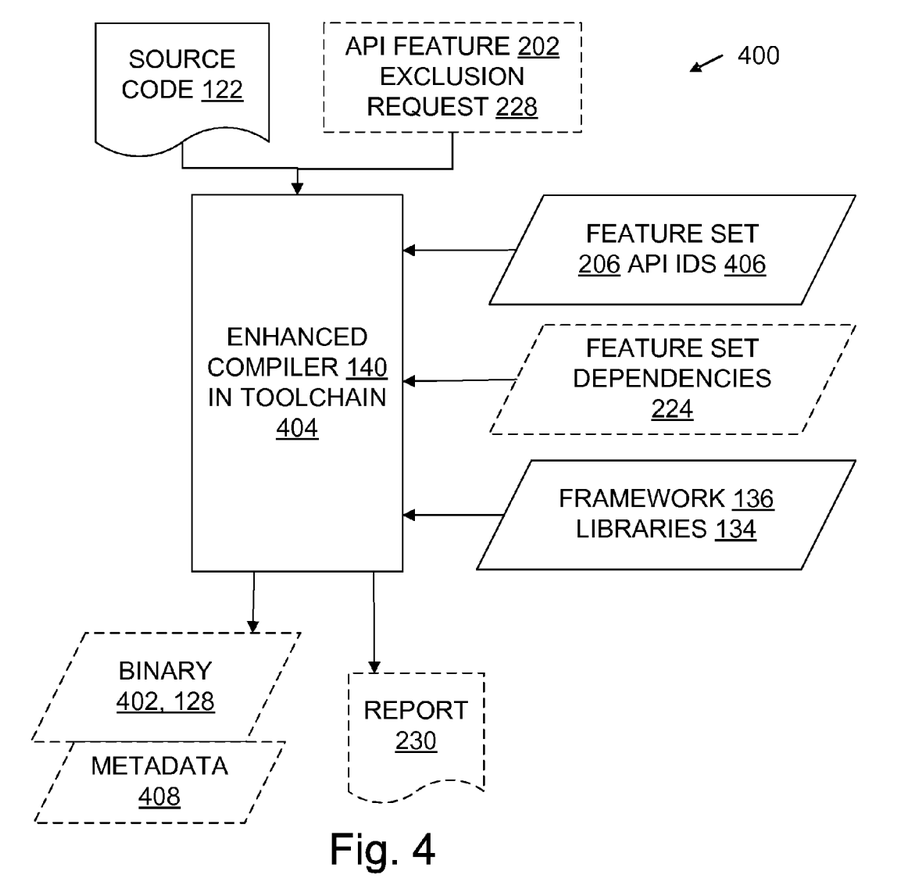
FIG. 4 is a data flow diagram illustrating compile-time controls for binary size optimization using functionality feature sets in an example architecture from an application developer's perspective.
Figure 5:
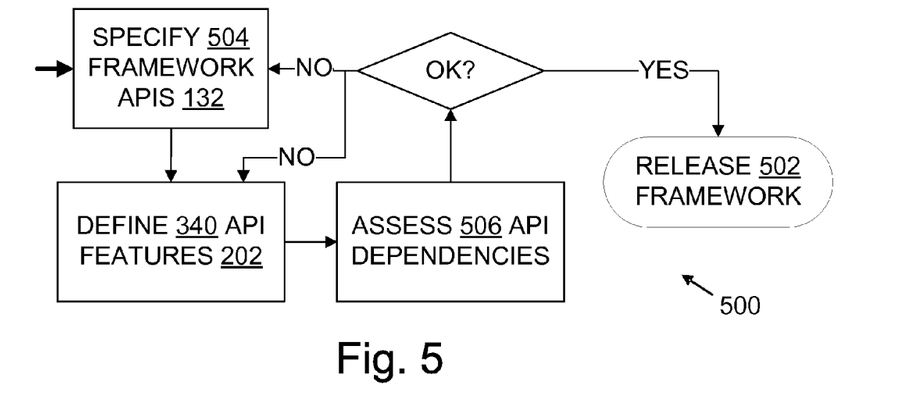
FIG. 5 is a flow chart illustrating steps of an application program interface specification process from a framework architect's perspective.

FIG. 3 illustrates some process embodiments in a flowchart 300, FIG. 4 illustrates particular compilation processes in a data flow diagram 400, and FIG. 5 illustrates particular framework design processes in a flowchart 500. Technical processes shown in the Figures or otherwise disclosed may be performed in some embodiments automatically, e.g., by an enhanced compiler under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flows, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some processes try to perform an AOT compilation without including an identified API feature; some processes make similar attempts at JIT compilation. For example, one process receives 302 a request 228 to perform an ahead-of-time (AOT) compilation of at least a portion of an application program 120. The request may take the form of a command line, a script statement, or a transfer of control within an executing 350 program, for example. The process determines 304 at least one application program interface (API) feature 202 which is to be excluded from the AOT compilation. The determination may be based on explicit identification of the API in a compiler command line, for instance, or on an implicit dependency that is not visible to a developer who made the compilation request. The API feature is defined 340 with a functionality feature API set 206 that identifies a set of APIs 132 of an established runtime framework 136 which is orthogonal to an object-oriented boundary 226 of the application program 120. The process attempts 308 to perform the AOT compilation 312. If the attempt succeeds, the process produces 314 a compiled (e.g., binary) version 204 of the application program without including the identified APIs in the compiled version, although in some cases the identity of the excluded APIs is part of the compiled version's metadata. If the process fails 310, an executable version 204 may or may not still be produced, depending on the embodiment and the defaults or settings and the reason for the failure.

In some embodiments, the process differs from familiar compilation and binding/linking in one or more of the following ways.

First, in familiar compilation/linking, a tree shaker 210 does a best effort optimization. In some compilation taught herein, the tree shaker is modified to remove and/or tree shake specified API feature(s) and in some cases, to complain with an error or warning when it cannot accomplish the API feature removal it was told to do.

Second, in some examples the exclusion of APIs accomplished (once the APIs to exclude have been identified), in that the enhanced compiler does not emit machine code (or intermediate representation or intermediate language tuples for these excluded APIs.

Third, in some examples compiler directives are used to specify the feature sets 206 and/or the features 202 to exclude.

Fourth, in some examples the features 202 to exclude are identified when parsing source code, and are treated as comments rather than as code to compile into binary. More generally, tree shaking can happen at any stage of a compilation-linking process. Some factors to consider when implementing tree shaking may include the type system, runtime system, programming language, and target architecture. Teachings herein can be implemented in many different ways, e.g., during different stages of the full compilation process such as building an abstract syntax tree, creating a symbol table, generating machine code, linking code, binding dynamic libraries, or loading code. Tree shaking implemented as a source to source rewriting tool will parse source and produce optimized source. Tree shaking at the intermediate language level (e.g., for a common language runtime environment) can operate in the front end of a compiler. In some circumstances, dependencies involving API sets/features are pre-compiled with little or no tree shaking in order to contain all API features, so a substantial portion of relevant tree shaking occurs when client (application 120) code is being built, not when the dependencies are built. Since the dependencies are already compiled binaries, the process of incorporating them into the application is referred to as "linking". In some circumstances, client (application) code and framework code are available to the application developer and tree shaking occurs earlier; this would be a likely scenario for applications on smartphones, tablets, and other small devices.

Fifth, in some examples an implementation adds a column to a symbol table to store the "feature id" of each symbol when creating the symbol table.

Sixth, in some examples binary output differences arise during linking, from API feature tree shaking 348. Tree shaking within a module (before linking) might also be useful, in addition to dead code elimination tree shaking during linking.

Seventh, as to binding dynamic code such as DLLs, in some cases when a DLL is built by statically linking several libraries, the grouped DLLs' image is tree shaken 348 to remove the implementations of excluded API features, using the same techniques as when tree shaking to remove API features from a statically linked program 120.

As to interpreted code, some processes exclude API features using one or more of the mechanisms noted above and/or otherwise taught herein. For instance, when building web apps 120 with ECMAscript programming languages, a process may operate to include only the used features out of the reusable components used by the app. Similarly, as to just-in-time compilation some processes include API feature directed tree shaking of intermediate language code which is input to a JIT code generator.

Those of skill will acknowledge that the API feature to exclude can be identified expressly by a developer, or can be completely hidden from the developer, and that exclusions can be more extensive than the developer's explicit request because of an API feature dependency. For instance, in some examples determining 304 at least one API feature to be excluded 306 from the AOT compilation includes getting 302 a request 228 from a developer 104 which expressly identifies 316 an API feature X to be excluded, e.g., by naming it in a command. In some examples, the determining step 304 includes automatically selecting 318 an API feature Y to be excluded, without getting an express request from a developer which expressly identifies the API feature Y, e.g., based on a default exclusion of particular API features (globalization, logging, or others) unless the developer confirms they were intentionally included. In some examples, the determining step 304 includes automatically selecting 326 an API feature Y to be excluded 306, in response to getting an express request from a developer which expressly identifies 316 an API feature X and ascertaining 320 (e.g., from an internal framework dependency list) that API feature Y depends on API feature X.

Sometimes an application 120 doesn't compile because an excluded API feature is used by the application. That is, some processes include failing 310 to perform the AOT or other compilation 312 when the application program depends on at least a portion of at least one API of the functionality feature API set that was to be excluded 306.

In some implementations, an enhanced compiler can respond to use of an excluded API feature by flagging it as an error, by merely issuing a warning, by reporting the size of the compiled application or what that size would be, or reporting the size of the API feature itself, and/or by listing the API features used in the application. That is, some processes include at least one of the following: flagging 328 as an error 330 a use in the application program 120 of an item from an API of the functionality feature API set; issuing 332 a warning message 334 that an item from an API of the functionality feature API set is used in the application program; reporting 336 a size 130 of the compiled version of the application program that includes use of an item from an API of the functionality feature API set; reporting 336 a size 130 of an item from an API 132 of the functionality feature API set which is used in the application program; emitting 337 a list of which API features the application program uses. The list of used and/or excluded APIs may be emitted as part of a separate report and/or be emitted as part of the binary's metadata 408.

Those of skill will acknowledge that the term "API" is sometimes used in different ways. For present purposes, however, unless clearly indicated otherwise APIs are defined to have a function signature, a class definition, and/or a public data type definition. Thus, some processes produce 314 the compiled version of the application program without including the identified APIs in the compiled version, in circumstances wherein at least one of the identified APIs defines at least one of the following: a function signature, a class definition, a public data type definition.

In some examples, determining 304 at least one API feature 202 to be excluded from an AOT compilation means determining to exclude an API feature which provides at least one of the following functionalities: data logging, event logging, data validation, event validation, localization of strings, localization of a display format, globalization support, administrator alerts, inspection of data without alteration of the data, malware scanning, scanning for a code security vulnerability, collections support, serialization support, deserialization support, debugging support, data pretty print support, source code pretty print support, or reporting on one of the foregoing.

In some examples, orthogonality is defined as an API feature including part—and only part—of a library. That is, the functionality feature API set 206 identifies at least one API (possibly an API of an established runtime framework) which is orthogonal to an object-oriented boundary 226 of the application program in that the API includes a proper subset of a library 134 that is used by the application program.

In some examples, dependencies 224 between API features can be added or removed. That is, some processes include at least one of the following: depending an API feature Y from an API feature X (i.e., add 322 a dependency), removing 324 a dependency of an API feature Y on an API feature X. This may be accomplished by modifying a table, list, tree or other data structure which documents the dependencies 224, for instance.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as feature API sets 206, API feature defining attributes 216, companion files 218, and/or compilers 140 enhanced to perform tree shaking on API features 202, in the form of data 118 and instructions 116, read from a removable medium 114 and/or another source such as a network connection, to form a configured medium. The configured medium 112 is capable of causing a computer system to perform technical process steps for creating, modifying, and utilizing API features 202 as disclosed herein. FIGS. 1 through 5 thus help illustrate configured storage media embodiments and process embodiments, as well as system and process embodiments. In particular, any of the process steps illustrated in FIGS. 3-5, or otherwise taught herein, may be used to help configure a storage medium to form a configured medium embodiment.

Some embodiments try to perform a compilation (AOT or otherwise) without including an identified API feature. For instance, some embodiments provide and/or utilize a computer-readable storage medium 114 configured with data 118 and with instructions 116 that when executed 350 by at least one processor 110 causes the processor(s) to perform a process which includes determining 304 at least one application program interface (API) feature 202 to be excluded from a compilation of an application program 120. The API feature is defined with a functionality feature API set 206 that identifies a set of APIs 132 of an established runtime framework 136. The API set 206 is orthogonal to an object-oriented boundary 226 of the application program in that the set 206 includes a proper subset of a library 134 used by the application program. The process also includes at least attempting 308 to perform the compilation to produce a compiled version of the application program without including the identified APIs in the compiled version.

In some embodiments, determining 304 at least one API feature to be excluded from the compilation includes at least one of the following: getting 302 a request from a developer which expressly identifies 316 an API feature X to be excluded; automatically selecting 326 an API feature Y to be excluded, without getting an express request from a developer which expressly identifies the API feature Y; automatically selecting 318 an API feature Y to be excluded 306, in response to getting 302 an express request from a developer which expressly identifies 316 an API feature X and ascertaining 320 that API feature Y depends on API feature X.

In some embodiments, the process further includes at least one of the following: flagging 328 as an error a use in the application program of an item from an API of the functionality feature API set; issuing 332 a warning message that an item from an API of the functionality feature API set is used in the application program; reporting 336 a size of the compiled version of the application program that includes use of an item from an API of the functionality feature API set; reporting 336 a size of an item from an API of the functionality feature API set which is used in the application program; emitting 337 a list of which API features the application program uses.

In some embodiments, determining 304 at least one API feature to be excluded from the compilation includes determining to exclude an API feature which provides at least one of the following functionalities: logging, validation, localization, alerts, security scanning, collections support, serialization support, deserialization support, debugging support.

Additional Examples

Additional details and architectural considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

FIG. 4 shows a data flow diagram 400 illustrating use of an enhanced compiler 140 in conjunction with API features 202. Application 120 source code 122 and a compilation request 228 are input to an enhanced compiler 140 with a list of API feature(s) 202 to be excluded from the binary 402 that is ultimately produced by the compilation toolchain 404. If any APIs which are identified by name, path, GUID, or other identifier 406 in API sets 206 as part of the API features whose exclusion is ordered cannot be excluded, e.g., because the application 120 has a direct or indirect dependence on part of such APIs, then a report 230 summarizing or elucidating the details will be produced by the toolchain. Dependencies 224 on excluded APIs may be identified by static flow analysis, or by a mapping of API content items (classes, functions, types) to API IDs 406, for instance. APIs may be part of framework 136 libraries 134.

FIG. 5 shows a flowchart 500 illustrating definition and utilization of API features 202 by a framework architect, e.g., before releasing 502 the framework to the public. Upon release, the framework becomes subject to use by multiple applications by multiple developers, and often subject to backward compatibility requirements, circumstances which make it much more difficult to refactor 338 the framework without breaking applications. A framework architect initially specifies 504 a set of framework APIs 132. Upon that foundation, the architect defines 340 API features whose semantic scope, interrelationships, and granularity seem suitable to the architect (at least) in view of performance and resource criteria for the framework. The architect assesses 506 the consequent dependencies between the APIs and/or between API features. This assessment may be based on code reviews, test applications, scenario-based testing, and other familiar software framework and/or application program development tools and techniques, adapted to exercise and exhibit characteristics not only of the APIs themselves but also of their groupings into API features 202. If the assessment reveals defects, the architect may attempt to remedy them by changing the (unreleased) APIs and/or by changing the groupings of APIs into features 202. When the assessment proves satisfactory and/or when production requirements dictate a release, some or all of the framework and the API feature definitions are released 502, either for wider internal use by the framework vendor's own developers or for use by others outside that vendor.

In many circumstances, all the APIs 132 of a class 126 reside in a single large file 128. In some systems, such a file may contain hundreds of APIs, or even thousands of APIs. Acquiring a dependency on even merely one of these APIs brings in the rest, which contributes to "binary bloat" by including within a binary executable some pieces of code 122 which are not actually needed for the executable to perform its designed and intended operations. One may attempt to remove code, e.g., by performing tree shaking 348, but sometimes unused code remains in place after conventional tree shaking efforts.

For instance, consider two APIs designated here as A and B, each of which has an implementation that calls a different portion of a third API C. A calls portion alpha of C, and B calls portion beta of C. This may arise, for example, based on differences in parameter values passed in the different calls. If an application program does not itself call B, then B could be removed from the application's binary without harming the application's functionality. But C cannot be safely removed, even though it is invoked by the unneeded API B, if the application calls API A, because A relies on C. Conventional tree shaking approaches have limited ability to identify API dependencies in such indirect and/or conditional dependency situations. Accordingly, to avoid breaking an application, familiar tree shaking errs on the side of including unneeded code rather than excluding code that might be needed by the application.

In the case of framework APIs, such dependencies are initially the result of choices made by the framework architect(s). After the framework is released to application developers, and application code has been written based upon the framework's APIs at the time of the release (whether it be an initial release or a subsequent update to the framework), altering the APIs may prevent an application from operating. This can occur even when the public face of the API, such as the function signatures and class members, have not been changed, if the underlying implementation changes. For instance, adding an API implementation dependency may result in code which is now needed for execution being "optimized" out of an application's binary. Accordingly, framework architects can benefit from tools and techniques taught herein for organizing APIs into feature sets that cut across familiar boundaries such as library, class, or file boundaries, and for adding or removing dependencies among such API features.

The following discussion is derived from .NET technology ProjectN documentation (marks of Microsoft Corporation). ProjectN includes software plans and code implemented by Microsoft Corporation. Aspects of the ProjectN technology have been renamed ".Net Native". Aspects of the ProjectN technology and/or documentation are consistent with or otherwise illustrate aspects of the embodiments described herein. However, it will be understood that ProjectN documentation and/or implementation choices do not necessarily constrain the scope of such embodiments, and likewise that ProjectN and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

In some examples, implementation of teachings herein includes marking 342 APIs 132 in a library 134 to indicate which API feature 202 they belong to; marking can be done with a language feature of the platform, such as Custom Attributes (CA) for .NET platforms or using 344 a companion file 218 such as an XML file. Using such marking, define 322 the allowed dependencies between feature areas. Using a static analysis tool 138, validate that the implementation conforms to the allowed architecture. When a library takes a dependency on another library, the static analysis tool marks references with the list of API features taken dependency on, in order to transitively communicate the necessary and sufficient dependencies of each library, to facilitate whole program comprehension. When performing AoC, the compiler 140 may be provided with optional directives of what API features to exclude. If the compiler finds calls to the banned features, it reports an error 330. The compiler will remove all APIs that are thus opted out from the native image.

In some examples, implementation of teachings herein includes supporting 346 partial classes in the intermediate representation used as input to the binder 142. The binder may be targeting either an ahead-of-time compilation solution, or a just-in-time environment. Factor each API feature 202 as a set of partial classes and regular classes. Taking a dependency 224 on a set of such features produces the type shape the programmer 104 intends to use, and the inter-library dependencies 224 represent the intended inter-API feature dependencies. The programmer opts in or out of API features 202 by including or excluding libraries 134 from the compilation scope.

Some examples include a method for configuring a compiler with an exclusion list of APIs that the compiler guarantees will not be called at runtime. Some examples include a method for grouping APIs into higher level units that can themselves be further grouped, and allowing such groups to be specified on the exclusion list.

In some examples, a system receives an identification of at least one API feature 202 to exclude from an AOT compilation of at least a portion of an application program 120. The API feature is defined as a set of APIs which is orthogonal to an object-oriented boundary of the application program. The system attempts the AOT compilation of the portion of the application program.

The system determines whether the AOT compilation of the portion of the application program depends on AOT compilation of the API feature to exclude. When the AOT compilation of the portion of the application program depends on AOT compilation of the API feature to exclude, then the system reports that the AOT compilation of the portion of the application program failed because it depends on AOT compilation of the API feature to exclude. When the AOT compilation of the portion of the application program does not depend on AOT compilation of the API feature to exclude, then the system produces an AOT compilation image of the portion of the application program which does not contain the API feature to exclude.

In some examples, the identification of at least one API feature to exclude 306 contains source code marked with an attribute denoting the API feature to exclude, e.g., a Custom Attribute in a .NET environment. In some, the identification of at least one API feature to exclude contains a companion file denoting the API feature to exclude, e.g., an XML file. In some, the identification of at least one API feature to exclude contains a partial class in an intermediate representation of the application program.

In some examples, in which at least two API features are defined, the system receives a user-defined specification of a dependency, in that a second API feature is specified to depend on a first API feature. The first API feature is identified to the system as a feature to be excluded from the AOT compilation. The system 102 reports that the AOT compilation failed 310 because it depends on AOT compilation of the second API feature.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3-5 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system comprising:
 a processor;
 a memory in operable communication with the processor;
 a functionality feature application program interface (API) set which identifies two or more APIs which collectively reside in two or more different libraries of the system and implement a functionality feature of an application program; and
 a compiler executable by the processor to provide compilations and execute a request which specifies exclusion of the functionality feature from a compilation of the application program.

2. The system of claim 1, wherein the compiler has a tree shaking code reduction component, and wherein the functionality feature API set identifies at least one API which includes a function signature having an implementation that is not separable from a baseline functionality of the application program by the tree shaking code reduction component.

3. The system of claim 1, wherein the functionality feature is defined at least in part by an API source code which is marked with an attribute that is specific to the functionality feature and indicates that the API source code belongs to the functionality feature.

4. The system of claim 1, wherein the functionality feature is defined at least in part by a text file which indicates that the API belongs to the functionality feature.

5. The system of claim 1, wherein the functionality feature is defined at least in part by a partial class in an intermediate representation of the application program.

6. The system of claim 1, further comprising a dependency specification which specifies that the functionality feature has an implementation which depends on another functionality feature's implementation.

7. The system of claim 1, wherein a baseline functionality of the application program excludes a functionality X, the functionality feature includes the functionality X, and the functionality X provides at least one of the following: data logging, event logging, data validation, event validation, localization of strings, localization of a display format, globalization support, administrator alerts, inspection of data without alteration of the data, malware scanning, scanning for a code security vulnerability, collections support, serialization support, deserialization support, debugging support, data pretty print support, source code pretty print support, or reporting on one of the foregoing.

8. The system of claim 1, wherein the functionality feature API set identifies APIs of an established runtime framework, and wherein execution of the application program without any API function call parameter mismatch depends in part on current function signatures of the APIs, whereby refactoring the APIs would break the application program.

9. A process comprising:
 receiving a request to perform an ahead-of-time (AOT) compilation of at least a portion of an application program;
 determining from a feature exclusion request at least one functionality feature to be excluded from the AOT compilation, the functionality feature defined with a set of identified application program interfaces (APIs) which includes a proper subset of a library used by the application program in an established runtime framework; and
 performing the AOT compilation to produce a compiled version of the application program that excludes the identified APIs from the compiled version.

10. The process of claim 9, wherein determining at least one functionality feature to be excluded from the AOT compilation comprises at least one of the following:
 getting a request from a developer which expressly identifies a functionality feature X to be excluded;

automatically selecting a functionality feature Y to be excluded, without getting an express request from a developer which expressly identifies the functionality feature Y;

automatically selecting a functionality feature Y to be excluded, in response to getting an express request from a developer which expressly identifies a functionality feature X and ascertaining that functionality feature Y depends on functionality feature X.

11. The process of claim 9, further comprising issuing a warning message that an item from an API of the functionality feature is used in the application program.

12. The process of claim 9, further comprising at least one of the following:

reporting a size of the compiled version of the application program that includes use of an item from an API of the functionality feature;

reporting a size of an item from an API of the functionality feature which is used in the application program;

emitting a list of which functionality features the application program uses.

13. The process of claim 9, wherein at least one of the identified APIs defines at least one of the following: a function signature, a class definition, a public data type definition.

14. The process of claim 9, comprising determining to exclude a functionality feature which provides at least one of the following functionalities: data logging, event logging, data validation, event validation, localization of strings, localization of a display format, globalization support, administrator alerts, inspection of data without alteration of the data, malware scanning, scanning for a code security vulnerability, collections support, serialization support, deserialization support, debugging support, data pretty print support, source code pretty print support, or reporting on one of the foregoing.

15. The process of claim 9, wherein the identified APIs include at least one API of an established runtime framework which is orthogonal to an object-oriented boundary of the application program in that it includes a proper subset of a library used by the application program.

16. The process of claim 9, further comprising at least one of the following:

depending aft functionality feature Y from aft functionality feature X;

removing a dependency of a functionality feature Y on a functionality feature X.

17. A computer-readable storage medium configured with data and with instructions that when executed by at least one processor causes the processor(s) to perform a process comprising the steps of:

determining from a feature exclusion request at least one functionality feature to be excluded from a compilation of an application program, the functionality feature defined with a set of identified application program interfaces (APIs) which includes a proper subset of a library used by the application program in an established runtime framework; and failing to perform the compilation by failing to produce a compiled version of the application program without including the identified APIs in the compiled version.

18. The computer-readable storage medium of claim 17, wherein determining at least one functionality feature to be excluded from the compilation comprises at least one of the following:

getting a request from a developer which expressly identifies a functionality feature X to be excluded;

automatically selecting a functionality feature Y to be excluded, without getting an express request from a developer which expressly identifies the functionality feature Y;

automatically selecting a functionality feature Y to be excluded, in response to getting an express request from a developer which expressly identifies a functionality feature X and ascertaining that functionality feature Y depends on functionality feature X.

19. The computer-readable storage medium of claim 17, wherein the process further comprises at least one of the following:

flagging as an error a use in the application program of an item from an API of the functionality feature set;

issuing a warning message that an item from an API of the functionality feature is used in the application program.

20. The computer-readable storage medium of claim 17, wherein determining at least one functionality feature to be excluded from the compilation comprises determining to exclude a functionality feature which provides at least one of the following functionalities: logging, validation, localization, alerts, security scanning, collections support, serialization support, deserialization support, debugging support.

21. A computing device comprising:

a processor;

a memory in operable communication with the processor; and a compiler which is executable by the processor and which responds to an exclusion request by excluding two or more APIs of a functionality feature from a compilation of an application program, wherein the compilation would include the APIs in the absence of the exclusion request, and wherein the two or more APIs collectively reside in two or more different libraries and implement the functionality feature.

22. The computing device of claim 21, wherein the compiler comprises at least one of the following:

code which is executable by the processor to flag as an error a use in the application program of an item from an API of the functionality feature;

code which is executable by the processor to issue a warning message that an item from an API of the functionality feature is used in the application program.

23. The computing device of claim 21, further comprising the compilation of the application program, wherein excluded APIs of the functionality feature implement at least one of the following functionalities: logging, validation, localization, administrator alerts, inspection of data without alteration of the data, malware scanning, scanning for a code security vulnerability, collections support, serialization support, deserialization support, debugging support, or reporting on one of the foregoing.

24. The computing device of claim 21, wherein the compiler comprises code which is executable by the processor to perform an ahead-of-time compilation of at least a portion of the application program.

* * * * *